Patented May 19, 1931

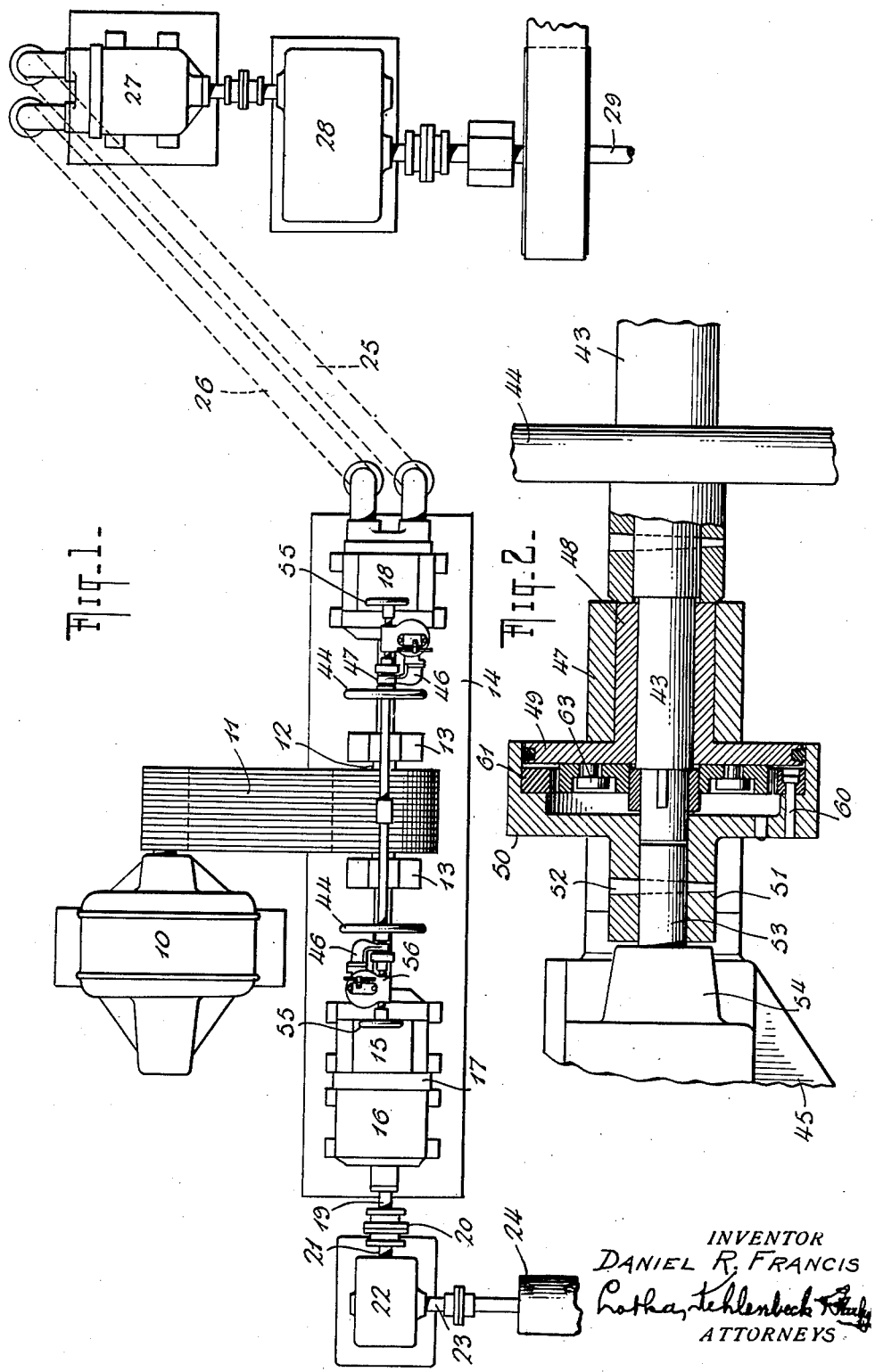

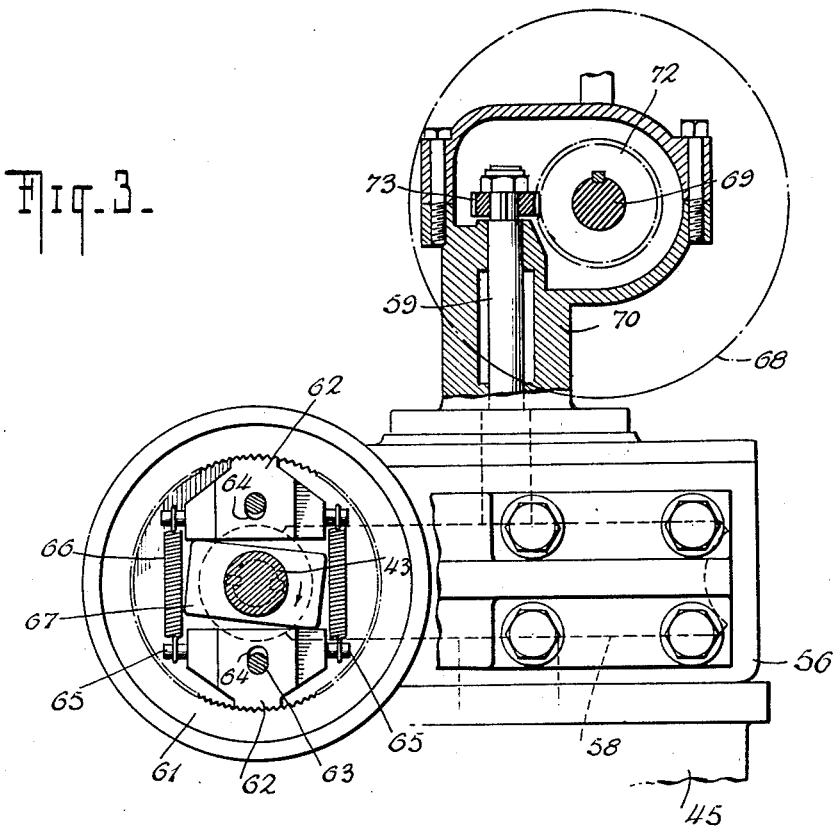

1,806,340

UNITED STATES PATENT OFFICE

DANIEL ROBERT FRANCIS, OF WATERBURY, CONNECTICUT, ASSIGNOR TO THE WATERBURY TOOL COMPANY, OF WATERBURY, CONNECTICUT, A CORPORATION OF CONNECTICUT

ADJUSTING MEANS FOR HYDRAULIC GEAR DRIVES

Application filed September 6, 1929. Serial No. 390,702.

The present invention relates to hydraulic speed gear installations for driving the sections or units of machines such as paper making machines or textile machines wherein the material being treated is passed continuously and successively from one machine unit or section to another and wherein it is highly desirable to provide means for adjusting the speed of a plurality of such sections simultaneously and also to vary independently the speed of adjacent sections.

The principal object of the present invention is to provide a new and improved construction for a driving mechanism for machines of the type above set forth, said mechanism consisting of a plurality of units and particularly hydraulic speed gears each of which is provided with an adjustable device for varying its speed and to associate with said adjustable devices, means for selectively actuating each one independently of the others or for simultaneously actuating a plurality of them.

Another object is to so construct an actuating mechanism for the adjustable controls of the plurality of hydraulic speed gears that the manually operable means for simultaneously setting a number of such controls will be normally in inoperative condition but will be made operative by the simple manipulation of a single manually operable member, movement of which in either direction to increase or decrease the speed of the gears will place such member in operative relationship with a plurality of said adjustable controls.

Considered from another viewpoint a further object of the invention is to provide a clutch of novel design in which engagement of normally disengaged clutch members is effected by producing rotation of the driving shaft and to so construct such clutch members that no opposed flat faces will offer resistance to their immediate engagement and so that but a slight amount of relative rotation of said shaft will be required in order to secure the interlocking or meshing engagement of said clutch members.

The above and other objects of the invention will appear more fully from the following more detailed description and by reference to the accompanying drawings forming a part hereof wherein Fig. 1 is a plan view of a hydraulic drive installation, constructed in accordance with the principles of this invention; Fig. 2 is an enlarged sectional detail of the clutch; Fig. 3 is another enlarged sectional detail taken substantially at right angles to the section of Fig. 2, and Fig. 4 is a view partly in side elevation and partly in section of the pump or A-end of the hydraulic gear.

As shown in the drawings, the numeral 10 indicates any suitable source of power such as an electric motor which drives, by means of a belt or chain 11, a driving shaft 12. The shaft 12 is mounted in suitable bearings 13 on a supporting frame or base 14. Carried by the base 14 is a plurality of hydraulic gear units which preferably are of the well known Waterbury type. One of such units, the one shown at the left-hand side of the frame 14, comprises a pump section 15 and a motor section 16 connected together to form a single assembly, the pump and motor sections 15, 16 being separated by a valve plate or midplate 17 as it is called in the art. The pump section 15 is driven by the main driving shaft 12 and said shaft is also employed for driving a second pump or A-end 18 of a Waterbury gear.

The driving shaft 19 of the motor 16 is connected by means of a flexible coupling 20 with the intake shaft 21 of a gear reduction 22. The latter may be of any suitable or standard construction and includes an output shaft 23 connected by any suitable coupling with, for example, the dryer section 24 of a paper machine.

The pump 18 is connected by pipes 25, 26 with a hydraulic motor 27 located some distance from the pump 18. The motor 27 is connected through a gear reduction 28 with a driven shaft 29 which drives in any suitable manner another machine unit or section, for example, the press section of the paper machine.

Each of the hydraulic pump units 15 and 18, as well as the motor units 16 and 27, is of similar construction and preferably are of the well known Waterbury type. Although the construction of such devices is well known in the art, I have illustrated in Fig. 4 enough of the constructional details of such units to enable their manner of operation to be clearly understood. As shown in Fig. 4, in which figure the pump 15 is shown partially in section, the driving shaft 30 of the pump has fixed thereto a rotating cylinder barrel 31. This barrel is provided with a plurality of cylinders 32 in each of which is mounted a piston 33. Each piston 33 is connected by means of a piston rod 34 with a swash plate 35 mounted for rotation in a tilting box 36. The swash plate is connected with the driving shaft 30 by means of a universal joint 37, said universal joint serving to rotate the swash plate in unison with the cylinder barrel and to permit the angular position of the swash plate and tilting box relatively to the axis of the driving shaft 30 to be varied if desired. When the swash plate is in the position shown in Fig. 4, perpendicular to the axis of the shaft 30, the piston 33 will have no stroke and no fluid will be pumped by the pump 15. When, however, the swash plate and tilting box are tilted from the position shown in the drawings, fluid will be pumped by the pump, the direction of flow and the extent of output of the pump being varied in accordance with the direction in which the tilting box is tilted and the extent of the inclination given to it.

In order to permit of the adjustment of the swash plate and tilting box, the latter is provided with a stub shaft 38 which projects into a rocking bearing 39 seated in the lower end of a control shaft 40. The control shaft 40 is provided with a screwthreaded portion 41 which screws into a rotatable nut 42 mounted in the pump casing for rotation but held against longitudinal movement therein. As will be readily understood, rotation of the nut 42 will bring about a longitudinal movement of the control shaft 40 either up or down in accordance with the direction of rotation of the nut 42. In accordance with the usual construction of Waterbury gears, the pump units are provided with adjustable control shafts for varying the angle of inclination of the tilting box and swash plate whereas in the motor units 16 and 27, the tilting box and swash plate preferably are held at a fixed angle of inclination. The speed of the motors is controlled or varied by varying the output of the pump which as hereinbefore pointed out is accomplished by manipulating the control shaft to change the adjustment of the tilting box and swash plate.

In installations of the type to which the present invention relates, it is desirable to adjust simultaneously the speeds of a plurality of adjacent sections or units of a sectional machine such as, for example, a paper machine. It is also desirable at times to vary the speeds of two adjacent sections relatively to each other to compensate for differences in the draw of the web of the material which passes successively through the machines. In accordance with the present invention, there is provided a main or master control shaft 43 which extends along the base 14 and is rotatably mounted in suitable bearings presently to be described. The ends of the master control shaft 43 terminate adjacent to the pump units 15 and 18 and the control shaft has secured to it closely adjacent to each end thereof a hand wheel 44. Each pump unit 15, 18 has secured to the top thereof a bracket 45 having an extension 46 terminating in a bearing boss 47.

Rotatably mounted in the bearing boss 47 is a hollow boss 48, see Fig. 2, which projects from the cover plate 49 of a clutch housing 50. The clutch housing 50 is provided with a boss 51 which is suitably fixed, as by means of the pin 52, to one end of a short shaft 53, rotatably mounted in a suitable bearing 54 formed in the bracket 45; said short shaft 53 being in axial alignment with the master control shaft 43. To the other end of the short shaft 53 is secured an individual control hand wheel 55. Each bracket 45 also carries a suitable gear casing 56 in which is mounted a worm 57 fixed upon the short shaft 53. The worm 57 meshes with a worm gear 58 keyed to an operating shaft 59. At its lower end the operating shaft 59 is secured in any suitable manner to the rotatable nut 42 which cooperates with the control shaft 40 of each pump.

The clutch housing 50 as clearly shown in Figs. 2 and 3 is a cup-shaped member and has suitably secured therein as by means of bolts 60 an internal gear 61. Slidably mounted in suitable guideways formed on the inner face of the cover plate 49 of the clutch housing is a pair of clutch members 62, said members being held within the guideways formed on the cover plate by means of the headed bolts or studs 63 which screw into suitable screwthreaded apertures provided in the cover plate and which pass through elongated slots 64 formed in the clutch members 62. Each clutch member has its outer face provided with a plurality of clutch teeth for meshing engagement with the teeth of the internal gear 61. Projecting laterally from each side of each clutch member 62 is a spring anchoring or supporting pin 65. A pair of coiled springs 66 extend across the space between the clutch members 62 and have their ends coiled about or anchored to the pins 65 and thus serve to hold the clutch members 62 normally out of engagement with the teeth of the internal gear 61 and to hold the inner flat faces of said clutch members against a cam 67. It will be understood that there are two cams 67, one keyed to each end of the master control shaft 43 and each located within a housing 50.

In order to facilitate adjustment of the sections of the machine to any desired speed, each pump 15, 18 has preferably associated therewith suitable indicating means. Such indicating means may be of any desired construction. In the present example, the setting of the control shafts of the pump 15, 18 is indicated by means of a dial 68 secured to the end of a shaft 69, the latter being rotatably mounted in a casing or bracket 70 suitably secured to the bracket 45. A pointer 71 is fixed to the top of the casing 70 for cooperation with the dial 68. The shaft 69 upon which the dial 68 is mounted has keyed to it a spiral gear 72 with which meshes a spiral gear pinion 73. The pinion 73 is secured to the upper end of the operating shaft 59 hereinbefore referred to.

The manner in which the installation operates is as follows: The motor 10 being placed in rotation will drive through the belt 11 the main driving shaft 12. The main driving shaft 12 is suitably connected with the driving shafts 30 of each of the pump units 15, 18. Let it be assumed that it is desired to adjust the speeds of the two adjacent machine sections simultaneously. The operator will then manipulate either of the master control hand wheels 44 to bring about rotation of the master control shaft 43. Immediately upon rotation of the master control shaft 43, the cams 67 carried by the ends of said shaft will be rotated to the inclined position indicated in Fig. 3 of the drawings thus causing each pair of clutch members 62 which are in engagement with the respective cams 67 to be moved outwardly against the action of the springs 66 and to cause the clutch teeth provided on the end of each clutch member 62 to be engaged with the teeth of the internal gear 61. As clearly shown in Fig. 3, the internal gear 61 is provided with a relatively large number of teeth of small pitch in order to insure ready and instant engagement of the teeth of the clutch members 62 with the teeth of the internal gear, said teeth are preferably of the well known Whitworth pitch. Due to the fact that the Whitworth pitch tooth is slightly rounded on its outer end, no flat faces are present in the construction that would form an obstruction to the meshing of the clutch teeth and consequently, because of the use of the Whitworth type tooth as well as of the small pitch of the teeth, instant engagement of the clutch members will occur. Continued rotation of the master control shaft 43 will cause the gear housings 50 to be rotated along with said master control shaft due to the meshing engagement of the clutch members 62 with the internal gear 61. The rotation of the master control shaft will therefore be communicated through the short shafts 53, the worms 57 and worm wheels 58 and shafts 59 to the control shaft nuts 42 of both pump units 15, 18 thereby producing longitudinal movement of each control shaft 40 in accordance with the direction and extent of the rotation of the master control shaft.

As soon as the rotation of the master control shaft 43 is stopped, the springs 66 will draw the clutch members 62 toward the axis of the shaft 43 and out of engagement with the internal gear 61. It will be seen by referring to Fig. 3 that the tension of the springs 66 will be transmitted through the clutch parts 62 against two diagonally opposite corners of the cam 67 so as to exert a turning pressure on the cam and master control shaft 43 which will be of sufficient force to turn the shaft 43 backward the relatively small amount necessary to permit disengagement of the clutch teeth of the clutch member 62 from that of the internal gear; the shaft 43 offers but a negligible amount of frictional resistance to this backward movement.

If at any time during the operation of the machine or in the starting thereof, it becomes necessary or desirable to vary the speed of one of the adjacent machine sections relatively to the other adjacent section, this may be readily accomplished by rotation of the individual hand wheel 55 for such section. It will, of course, be understood that when it is desired to perform an individual adjustment, the hand wheel 44 will have been released so that the clutch members 62 will be disengaged as above described. Rotation of either individual hand wheel 55 under these conditions will therefore bring about a rotation of the control shaft nut 42 for the particular pump unit whose speed is to be adjusted; the rotation of the hand wheel 55 causing rotation of the short shaft 53 and producing a rotation of the operating shaft 59 to the worm 57 and worm gear 58. When either individual hand wheel is rotated, the clutch housing 50 which as described is secured to the end of the short shaft 53 will also be rotated but as the clutch members 62 are disengaged from the internal gear 61, the rotation of the hand wheel 55 and short shaft 53 will not be communicated to the master control shaft 43.

It will be understood that when the driving shafts 30 of the pump units 15 and 18 are rotated by means of the motor 10, belt 11 and main driving shaft 12 and that when the swash plates and tilting boxes of such pump units are adjusted to an angular position relatively to either of the respective driving shafts 30, that fluid will be pumped by the units 15, 18 respectively to the motor units 16, 27 to bring about rotation of the driving shafts of such motor units, and that the rotation of the driving shafts of the motor units will be communicated through the gear boxes 22, 28 respectively and the driving connections associated therewith to cause the adjacent sections of the machine to be driven at speeds determined by the adjustment of the control shafts of the pumps.

While I have described and illustrated a satisfactory and successful constructional example of an installation embodying the principles of my invention, it will be understood that the invention is not limited to the specific constructional details shown, but that many changes, variations and modifications may be resorted to without departing from such principles, for example it will be obvious that the invention is not limited to use with but two adjacent machine units or sections as shown but may be employed with any desired number of such units. Likewise while the invention has been referred to as particularly adapted for use with paper machines, it will be understood that it is applicable for use with any sectional machine that operates successively on material to be treated.

I claim:

1. In a hydraulic driving gear installation, a plurality of driving gear units each provided with an adjustable control shaft, an individual controlling device for each of said control shafts, a master controlling device, and normally inactive clutch means interposed between said master device and said control shafts and automatically rendered active upon operation of said master device, and means whereby said clutch means is automatically restored to its normal inactive condition when the operation of said master device ceases.

2. The combination with a plurality of machines or machine sections that operate successively on material treated thereby, of a hydraulic driving gear consisting of a plurality of pump and motor units, said pump units being provided with an adjustable control shaft for varying the pump's output, a manually operable individual device for each of said control shafts, a rotatable master control and normally inoperative clutches between said master control and a plurality of said control shafts, and cam means actuated by initial rotation of said master control for causing said clutches to become operative and to remain operative as long as said master control is rotated.

3. A hydraulic gear installation of the type wherein a plurality of machine units or sections, which operate successively upon material passing therethrough are driven by hydraulic gear units consisting of a pump and motor and said pump is provided with adjustable control shaft for varying its output characterized by means for actuating a plurality of said control shafts in unison or for actuating each of said shafts independently, said means comprising a plurality of individual manually operable controls and gearing directly connecting each of said controls with its respective control shaft, a master control clutch means between said master control and a plurality of said individual controls, means for normally holding said clutch means disengaged, and means for causing rotation of said master control to automatically move said clutch means into engagement.

4. A hydraulic gear installation as set forth in claim 3, in which each individual control includes a clutch housing permanently connected by the gearing with its respective control shaft, an internal gear carried by said housing, a plurality of clutch members mounted in said housing for movement into engagement with said internal gear, and means for normally holding said clutch members in inoperative position.

5. A hydraulic gear installation as set forth in claim 3, in which each individual control includes a clutch housing permanently connected by the gearing with its respective control shaft, an internal gear carried by said housing, a plurality of clutch members mounted in said housing for movement into engagement with said internal gear, and means for normally holding said clutch members in inoperative position, and the master control includes a cam for each individual control adapted upon rotation of said master control automatically to move the respective clutch members immediately into engagement with their respective internal gears.

6. A hydraulic gear installation as set forth in claim 3, in which each individual control includes a clutch housing permanently connected by the gearing with its respective control shaft, an internal gear carried by said housing, a plurality of clutch members mounted in said housing for movement into engagement with said internal gear, and means for normally holding said clutch members in inoperative position, and said internal gear and clutch members being provided with gear teeth of small pitch for permitting instant engagement of said clutch members and internal gear.

7. A hydraulic gear installation of the type wherein a plurality of machine units or sections, which operate successively upon material passing therethrough are driven by hydraulic gear units consisting of a pump and motor and said pump is provided with an adjustable control shaft for varying its output characterized by means for actuating a plurality of said control shafts in unison or for actuating each of said shafts independently, said means comprising a plurality of individual manually operable controls and gearing directly connecting each of said controls with its respective control shaft, a master control, clutch means between said master control and a plurality of said individual controls, means whereby rotation of said master control will immediately and automatically cause engagement of said clutch means and thereafter rotation of said individual controls and control shafts in unison, and means for causing disengagement of said clutch means automatically as soon as the rotation of said master control is stopped.

8. A hydraulic gear installation of the type wherein a plurality of machine units or sections, which operate successively upon material passing therethrough are driven by hydraulic gear units consisting of a pump and motor and said pump is provided with an adjustable control shaft for varying its output characterized by means for actuating a plurality of said control shafts in unison or for actuating each of said shafts independently, said means comprising a plurality of individual manually operable controls and gearing directly connecting each of said controls with its respective control shaft, a master control, clutch means between said master control and a plurality of said individual controls, cams operatively associated with said master control and said clutch means adapted upon rotation of said master control to move said clutch means into operative position, and yielding means for holding said clutch means in engagement with said cams and normally out of engagement with said clutch means.

In testimony whereof I have hereunto set my hand.

DANIEL ROBERT FRANCIS.